(No Model.)

J. ARBTIN.
SMOKING PIPE.

No. 447,653. Patented Mar. 3, 1891.

WITNESSES:
F. L. Ourand.
Wm. F. Folks.

INVENTOR:
John Arbtin,
By Louis Bagger & Co.
Attorneys

UNITED STATES PATENT OFFICE.

JOHN ARBTIN, OF DES MOINES, IOWA.

SMOKING-PIPE.

SPECIFICATION forming part of Letters Patent No. 447,653, dated March 3, 1891.

Application filed July 29, 1890. Serial No. 360,262. (No model.)

*To all whom it may concern:*

Be it known that I, JOHN ARBTIN, a citizen of the United States, and a resident of Des Moines, in the county of Polk and State of Iowa, have invented certain new and useful Improvements in Smoking-Pipes; and I do hereby declare that the following is a full, clear, and exact description of the invention, which will enable others skilled in the art to which it appertains to make and use the same, reference being had to the accompanying drawings, which form a part of this specification, and in which—

Figure 1:
Figure 2:
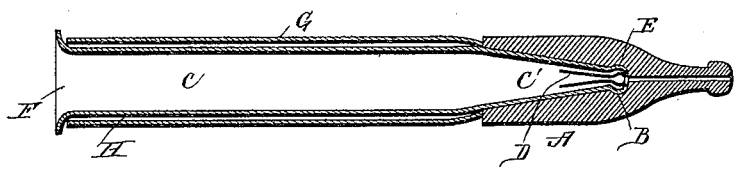
Figure 3:
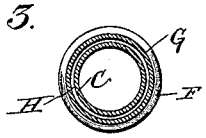
Figure 4:

Figure 1 is a perspective view of my improved smoking-pipe. Fig. 2 is a longitudinal sectional view of the same. Fig. 3 is a transverse sectional view of the device on line $x$ $x$ in Fig. 2, and Fig. 4 is a perspective detail view of the bowl with the cover and mouth-piece removed.

Like letters of reference denote corresponding parts in the several figures.

My invention relates to smoking-pipes of the type generally termed "smoking-tubes," and has for its object to provide means for securely holding the bowl in the stem or mouth-piece while the device is in use and still require no great amount of force to separate the parts when it is desired to clean the device. Furthermore, to provide means whereby the fingers of the user will be kept from being burned in handling the device.

Referring to the drawings, the letter A designates the stem or mouth-piece of the pipe, which is exactly like an ordinary cigar-smoker, except that it is notched inside, as shown at B.

C designates the metallic bowl, the end C' of which is conical in shape to correspond with the shape of the inside of the stem A. This conical portion is slotted longitudinally at D, and its extreme outer end is formed into lugs E, which are designed to fit into the notch B. These lugs are of such a shape that when the conical portion of the bowl is put into the stem or mouth-piece the lugs will be brought into contact with the inside surface of the stem just before the notch, and by pushing the bowl a little farther into the stem the lugs will be forced into and engage the notch, and by so doing the whole inside surface of the stem from the notch to the forward end will be in contact with the bowl. The opposite or outer end of the bowl is flanged at F, the object of which will be explained farther on in this specification.

The letter G designates a cylindrical sleeve, which is slightly larger in cross-section than the bowl C, thus leaving an air-space H between the two parts. This cylinder is just long enough to fit between the stem and the flange F on the end of the bowl, and is made of any suitable light material.

When it is desired to put the device together, the sleeve is first put on the bowl and the conical-shaped end of the bowl inserted into the stem, as before described. The bowl is then filled with tobacco and the device is ready for use.

Having thus fully described my invention, what I claim as new, and desire to secure by Letters Patent of the United States, is—

The combination of the cylindrical bowl having a flange at its outer end and slotted longitudinally at its inner tapering end, said slotted part bent to form lugs, the stem or mouth-piece having an inside annular notch or recess adapted to engage said lugs, and the cylindrical sleeve of larger diameter than the bowl and confined endwise between the outer flange on the same and the mouth-piece, substantially as and for the purpose shown and set forth.

In testimony that I claim the foregoing as my own I have hereunto affixed my signature in presence of two witnesses.

JOHN ARBTIN.

Witnesses:
   O. C. PETERSON,
   A. M. MILLER.